US011047731B2

(12) United States Patent
Burck et al.

(10) Patent No.: US 11,047,731 B2
(45) Date of Patent: Jun. 29, 2021

(54) AUTO-CALIBRATION OF LOAD CELL IN MEASURING DISCRETE WEIGHTS

(71) Applicant: JOHNSON HEALTH TECH CO., LTD, Cottage Grove, WI (US)

(72) Inventors: Robert C. Burck, Middleton, WI (US); Mark J. Kannel, Oconomowoc, WI (US)

(73) Assignee: JOHNSON HEALTH TECH CO., LTD, Cottage Grove, WI (US)

( * ) Notice: Subject to any disclaimer, the term of this patent is extended or adjusted under 35 U.S.C. 154(b) by 195 days.

(21) Appl. No.: 16/359,436

(22) Filed: Mar. 20, 2019

(65) Prior Publication Data
US 2019/0293480 A1 Sep. 26, 2019

Related U.S. Application Data

(60) Provisional application No. 62/646,216, filed on Mar. 21, 2018.

(51) Int. Cl.
*A63B 24/00* (2006.01)
*G01G 19/18* (2006.01)
*G01G 19/52* (2006.01)
*G01G 23/01* (2006.01)
*A63B 21/06* (2006.01)
(Continued)

(52) U.S. Cl.
CPC ......... *G01G 23/012* (2013.01); *A63B 21/063* (2015.10); *A63B 24/0062* (2013.01); *G01G 19/18* (2013.01); *A63B 21/151* (2013.01); *G01G 19/52* (2013.01)

(58) Field of Classification Search
CPC ...... G01G 19/18; G01G 23/01; G01G 23/012; G01G 19/52; A63B 21/063; A63B 24/062; A63B 21/151
See application file for complete search history.

(56) References Cited

U.S. PATENT DOCUMENTS 5,191,543 A * 3/1993 Berthel ................ G01G 23/012
177/50
5,407,030 A * 4/1995 Burton ..................... B66B 1/28
177/264
(Continued)

FOREIGN PATENT DOCUMENTS

WO 2017015758 A1 2/2017

OTHER PUBLICATIONS

Life Fitness, "New Life Fitness Mobile App Creates Ultimate Personalized Gym Experience." <https://lifefitness.com/pressreleases/new-life-fitness-mobile-app-creates-ultimate-personalized-gym-experience>, Mar. 19, 2013, 3 pages.
(Continued)

*Primary Examiner* — Randy W Gibson
(74) *Attorney, Agent, or Firm* — Michael Best & Friedrich LLP (57) ABSTRACT

A method to automatically calibrate a load cell without the need to remove the loading on the load cell. This method takes advantage of the fact that weight stack strength equipment uses generally known discrete weight increments, and any signal drift in the load cell can be automatically recalibrated by offsetting the load cell signal to accurately reflect the expected discrete weight increments without the need for unloading the load cell and without the need for a manual recalibration of the load cells.

11 Claims, 6 Drawing Sheets

(51) Int. Cl.
  *A63B 21/062* (2006.01)
  *A63B 21/00* (2006.01)

(56) References Cited

U.S. PATENT DOCUMENTS

| | | | |
|---|---|---|---|
| 5,785,632 | A | 7/1998 | Greenberg et al. |
| 7,785,232 | B2 | 8/2010 | Cole et al. |
| 8,062,182 | B2 | 11/2011 | Somers |
| 8,126,619 | B2 * | 2/2012 | Corder .................... E02F 9/264 |
| | | | 701/50 |
| 8,370,031 | B2 * | 2/2013 | Claxton .................... E02F 3/30 |
| | | | 701/50 |
| 9,345,947 | B2 | 5/2016 | Harris et al. |
| 9,474,935 | B2 | 10/2016 | Abbondanza et al. |
| 9,630,060 | B2 | 4/2017 | Volkerink et al. |
| 9,849,333 | B2 | 12/2017 | Fung |
| 2009/0269728 | A1 | 10/2009 | Verstegen et al. |
| 2013/0196821 | A1 | 8/2013 | Watterson et al. |
| 2016/0346617 | A1 | 12/2016 | Srugo et al. |
| 2017/0173394 | A1 | 6/2017 | Rider et al. |
| 2018/0050234 | A1 | 2/2018 | Kashyap |

OTHER PUBLICATIONS

Viafit, <https://viafitness.com/en/> webpage available as early as Oct. 20, 2014, 4 pages.

* cited by examiner

| Plate Count | Mass | Remainder | | |
|---|---|---|---|---|
| | | Sum | Count | Running Average |
| 0 | 10.00 kg | +0.01 | 5 | 0.00 |
| 1 | 14.00 kg | -2.53 | 23 | -0.11 |
| 2 | 18.00 kg | +7.20 | 40 | +0.18 |
| 3 | 22.00 kg | +1.60 | 32 | +0.05 |
| 4 | 26.00 kg | -1.60 | 20 | -0.08 |
| 20 | 90.00 kg | -0.60 | 3 | -0.20 |

FIG. 6

AUTO-CALIBRATION OF LOAD CELL IN MEASURING DISCRETE WEIGHTS

CROSS-REFERENCE TO RELATED APPLICATIONS

This application claims priority to U.S. Provisional Patent Application No. 62/646,216, filed on Mar. 21, 2018, the entire contents of which are incorporated by reference herein.

BACKGROUND

The present invention relates to strength machines for the fitness industry, and particularly to a method for automatically calibrating strength machines.

Strength machines commonly include a weight tower with a primary weight stack of multiple, discrete weight plates that can be selected to vary the amount of weight being lifted by the user. The top weight plate is typically comprised of a weight plate attached to a vertical rod called a bayonet that penetrates through holes each of the other weight plates when the machine is in the static rest position. The bayonet contains holes placed linearly down the length of the rod that align with holes in or between the individual weight plates. The bayonet and top weight plate are attached to a cable, which travels through a pulley system to connect the weights to the rest of the machine (i.e. the user input component).

Most weight stack strength machines are completely manual in their function. The user must manually place a selector pin into the hole on the weight plate that correlates with their desired load. This pin extends through the weight plate into the bayonet to thereby engage the desired number of plates during the exercise. The user then performs the exercise, typically counting how many repetitions of the exercise they perform as they perform the exercise. If the user desires to record any information related to their exercise performance, the user would typically need to manually record this information (for example, the user may use paper and a pencil to manually record the weight lifted, the number of reps per set, and the number of sets performed). The typical weight stack strength machine does not have any computers or measurement equipment to assist the user in measuring or recording exercise performance.

The goal for most users is to increase the load they are capable of lifting over time. For most weight machines, loads are limited to fixed amounts in increments depending on the size of the weight plates, which are commonly 10 or 20 pounds. This fixed increment can be an obstacle for some users when they have progressed beyond a certain weight, e.g. 40 pounds, but they are not quite strong enough for the next increment, which would be 50 pounds. It is during situations like this that incremental weights can be advantageous. Incremental weights are typically small weights, of varying shapes and sizes, that the user can select or manually add to the primary weight stack to increase the load by a small amount. Typical incremental weights come in weights from 1 to 5 pounds. These plates allow the user to increase their achievable load more gradually than the standard weight plates on the machine would allow.

In more advanced strength machines, the amount of weight being lifted and the number of reps or sets may be measured and tracked by the machine so that a record of the user's exercise session can be created and saved automatically by the advanced strength machine. These records can be used to track a user's progress and to determine whether or not modifications to the user's exercise program might assist the user in meeting their goals. To assist a user in the measurement and recording of exercise performance, a more advanced weight stack strength machine might utilize one or more load cells that measure the amount of weight being lifted by the user. Load cells, especially when subjected to loading for an extended period of time, can produce a signal that tends to drift over time due to creep in the materials, temperature changes, or a variety of other reasons. This can cause an offset value of the load cell signal to drift over time. Periodic calibration of the load measurement system can compensate for this drift, allowing the load measurement to be correct despite this signal drift.

In many weighing systems, there is an opportunity to null the output of the weighing system at times when there is no applied load on the weighing system. For example, a health scale can be set to zero when there is no load (no body weight) applied to the scale. Assuming a weighing system with a generally linear measurement output with a gain (slope of a line) and an offset, zeroing out the weighing system when there is no applied load (null output) corrects any measurement drift of the offset (the y-intercept as shown on a graph), while leaving the gain largely unchanged. If a more accurate calibration is desired, measurement of a calibrated weight after correcting the offset allows the gain of the measurement system to be fully calibrated. A typical weighing system will have this feature. However, performing a no-load calibration is time-consuming, and must be performed periodically in order to maintain the accuracy of the load cell.

In a weight stack strength machine, it may not be feasible or desirable to remove all loads on a load cell. The weight stack always has at least a top weight plate which is never removed from the cable transmission, and this minimum load applies some amount of tension to the cable transmission. This tension in the cable transmission is important to keep the cable engaged with the pulleys throughout the strength machine. Additionally, on many strength machines, the tension in the cable transmission extends to exercise work arms, holding them in a proper start position. Because of this required minimum loading that is part of the design of a weight stack strength machine, it is not feasible or desirable to remove all loads on load cells within a weight stack strength machine to perform a no-load calibration of the strength machine. Given that load cell drift may occur in a very short period of time, possibly within just days or weeks, calibration may be required on a nearly daily basis. A no-load calibration would require frequent disassembly of the exercise equipment to allow the load cells to be calibrated in a no-load condition. This frequent disassembly of the strength machine is not desirable to the users of the equipment, who cannot use the equipment while it is disassembled. It is also not desirable to the fitness club owners, who would prefer to spend less time and money on maintenance of the equipment.

SUMMARY

The present invention uses the measurement of multiple known weights with expected weight increment levels to allow the automatic calibration of the load measurement system without the need to place the load cell into a no-load condition. Additionally, the load cell signal can be used to measure the tension in the cable to ensure that the unit has a properly tensioned cable, and to alert the fitness facility if the cable is found to be improperly tensioned. Also, other maintenance issues can also be diagnosed from the load cell signals, such as binding or high friction within the weight stack strength machines (for instance, increased friction between the weight plates and the guide rods).

In one aspect, the invention provides a method of using the mass values of known discrete weights in conjunction with the value of a signal from a load cell or other load measuring mechanism to estimate the correct amount of mass being used in the performance of an exercise.

In another aspect, the invention provides a method of using the remainder between the value of a signal from a load cell or other load measuring mechanism and the estimated correct amount of mass to calculate the amount of signal drift in the signal from the load cell or other load measuring mechanism, and to use the calculated signal drift to auto-calibrate the load cell or other load measuring mechanism.

In a third aspect, the invention provides a method of using the remainder between the value of a signal from a load cell or other load measuring mechanism and the estimated correct amount of mass and various expected mass values to calculate the correct scale or gain level in the signal from the load cell or other load measuring mechanism, and using the calculated correct gain level to auto-calibrate the load cell or other load measuring mechanism.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The following terminology will be used throughout this patent application.

Load Cell: A component used to measure loading applied to it. Includes load cells that measure load based on tensile elongation, compression, or torque, among others. An example of a load cell is a substantially rigid material with one or more strain gauges bonded to it.

Load Measurement System: A system including at least a load cell and a processor for converting the load cell signal into a load measurement. It may also include an amplifier and an analog-to-digital converter, or the analog-to-digital converter could be incorporated into the processor.

Weight Plates or Plates: Any object with a mass used to provide resistance to a strength machine.

Amplifier: An electronic circuit that magnifies the DC voltage signal coming from the load cell.

ADC: Analog-to-digital converter—converts the DC voltage to a number, the output being ADC counts.

Load Cell Output: The output of the load cell, which could be the analog DC voltage signal from the strain gauge, or it could be the value of ADC counts coming from the load cell/ADC system.

Offset: The value of ADC counts resulting from a no-load condition. In this system, a true no-load condition only exists when the cable is removed from the pulley.

Calibration: Determining the relationship between applied force and ADC counts.

For a generally linear system, this calibration would determine proper values for Offset and/or Gain in the formula: Force=(Gain)*(ADC counts)+(Offset) of the load measurement system.

Gain: The scaling factor that allows Force to be accurately calculated in a generally linear system, given a correct Offset value and a value for ADC counts.

Figure 1:
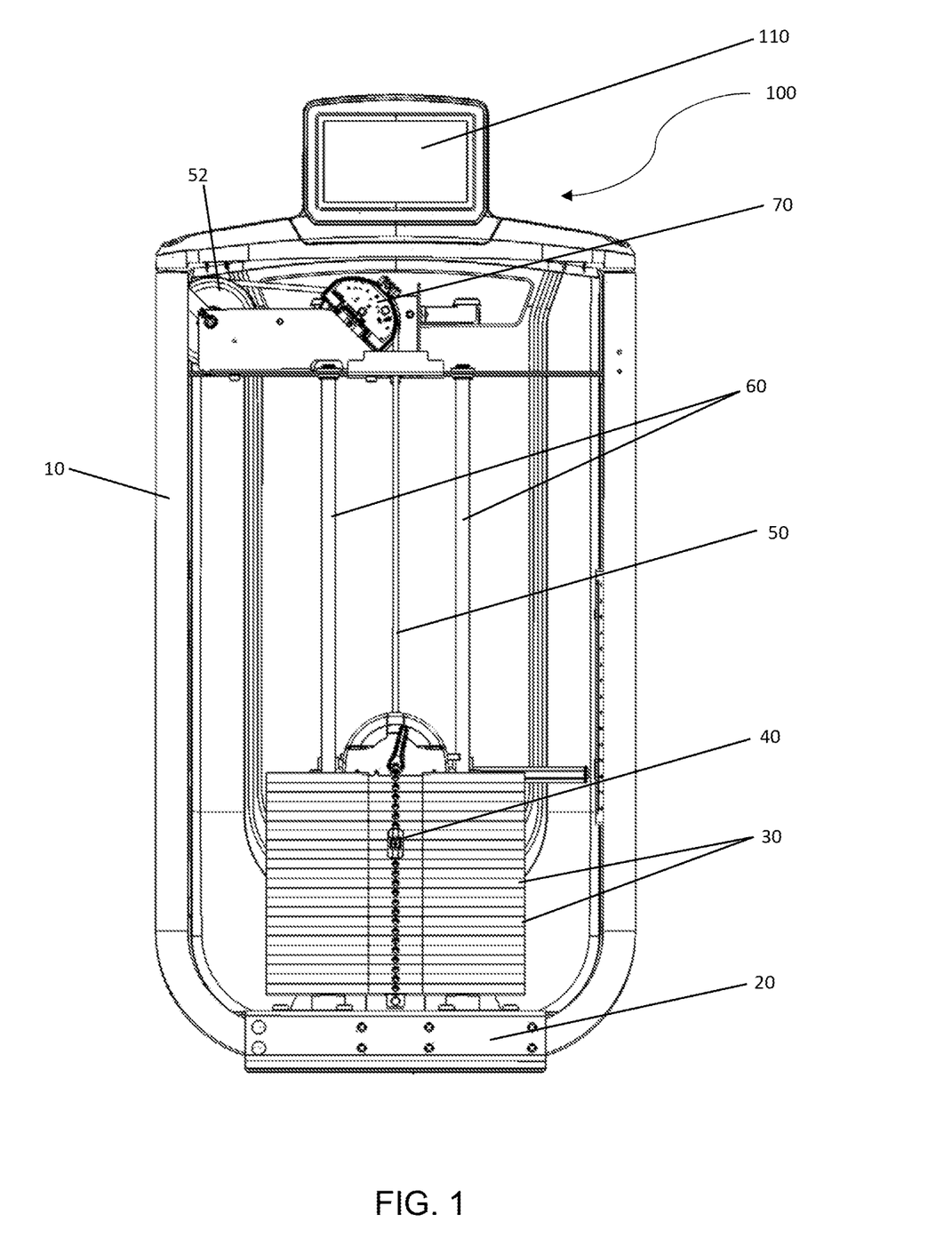
FIG. 1 is a front view of a weight stack from a weight stack strength machine constructed in accordance with the present invention.
Figure 2:
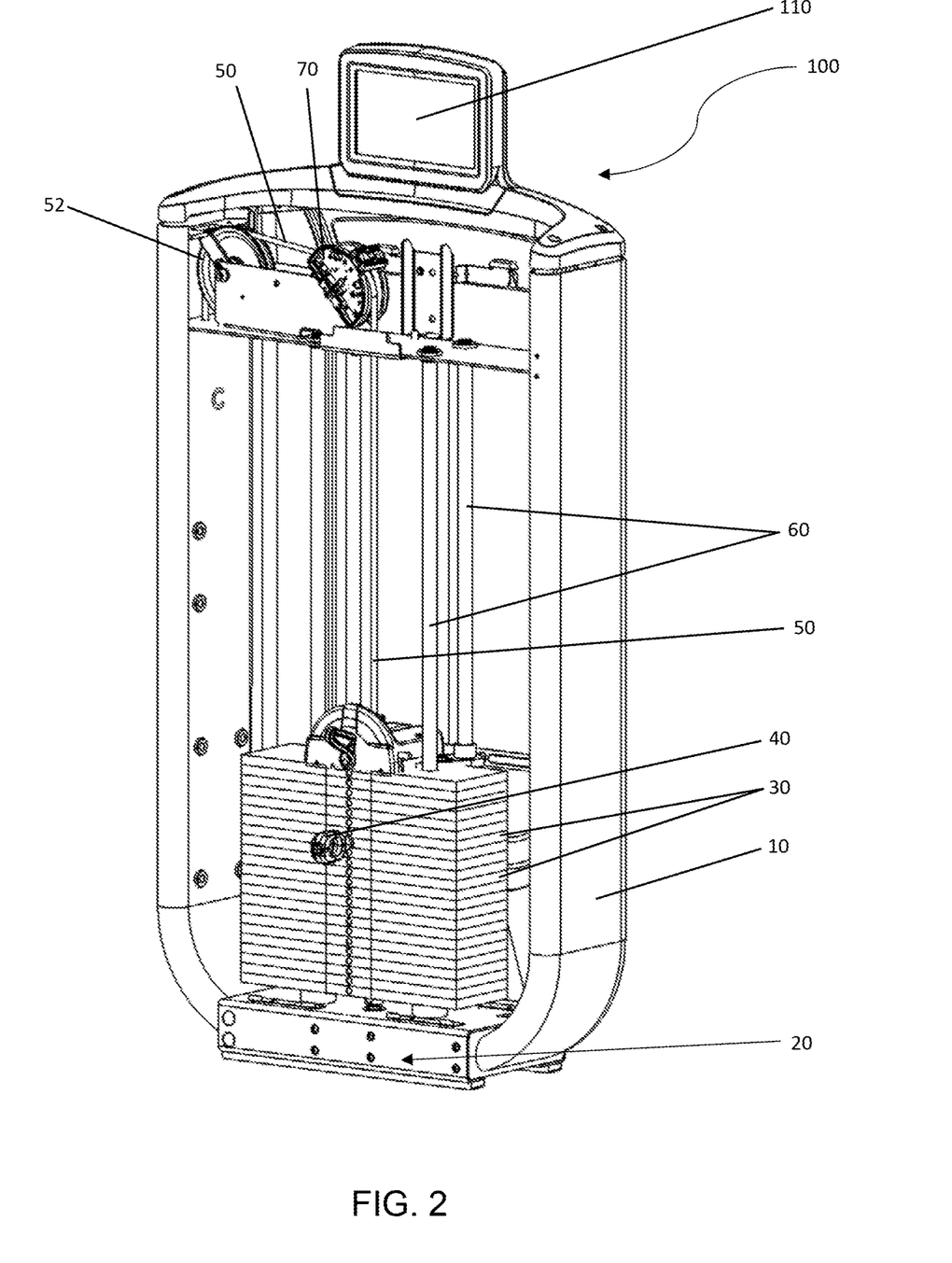
FIG. 2 is a perspective view of the weight stack and weight stack strength machine of FIG. 1.
Figure 3:
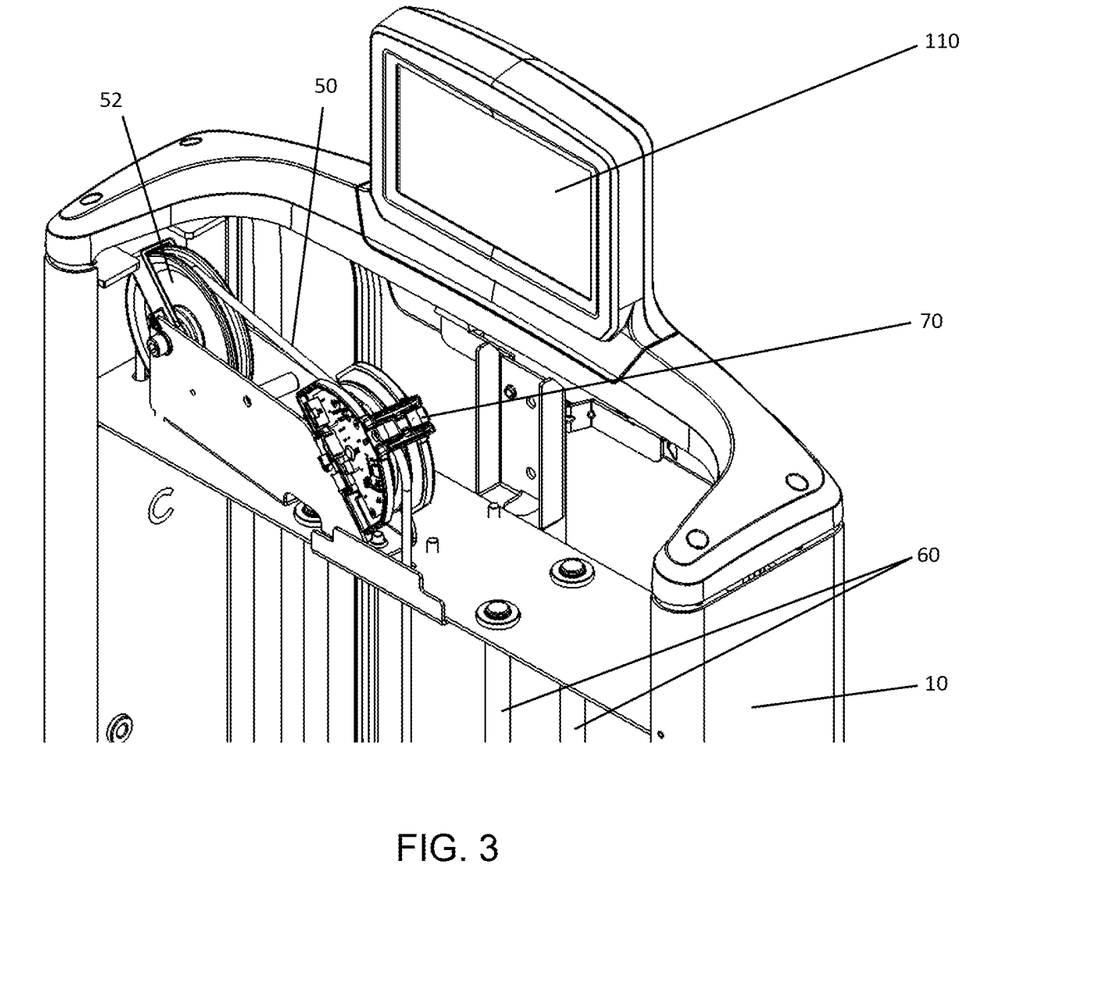
FIG. 3 is a close-up view of a load cell mechanism from the weight stack of FIG. 2

FIG. 1-3 illustrate a weight stack strength machine 100 exemplifying an embodiment of the invention. The weight stack strength machine 100 has a frame 10, a base 20 that is part of the frame 10, and a plurality of weight plates 30 constrained to be guided along one or more guide rods 60. The amount of mass to be used for performing the exercise is chosen using a selector pin 40 inserted into holes in a bayonet (not shown) for selecting the number of weight plates 30 to engage during the exercise. Performing the exercise pulls on a cable 50 that passes over one or more pulleys 52 to lift the selected weight plates 30. A load cell 70 is used to measure the load used for performing the exercise. The load cell 70 is positioned between the pulley 52 and the frame to thereby provide a signal indicative of the force on the pulley cause by the cable lifting a weight. The load cell signal is calibrated to provide a signal corresponding with the tension in the cable 50. A display console 110 (which may also include a processor and memory storage) is used to display information to the user of the exercise device. The display console 110 is used to display the amount of mass used during the performance of the exercise.

The present invention takes advantage of the fact that weight stack strength equipment is shipped with uncalibrated, but generally known discrete weight increments. For example, if a load measurement system or load cell 70 measures that a stack of weight plates 30 weighs the equivalent weight of 19.74 kg, but the individual weights come in 10 kg increments, then the computer or processor associated with the weight stack strength machine 100 can estimate that the true weight is 20 kg (force), and record the remainder (the difference) of −0.26 kg (force) as the offset. This remainder can be used to calibrate the load measurement system. If multiple readings of the load cell 70 are found to have similar remainders, this shows a repeatable pattern in the offset value (drift) of the load cell signal, and this raises the confidence level of the recalibration.

As another example, if an exercise is being performed that lifts a top weight plate 30 with a bayonet (not shown in Figs), together massing 10.00 kilograms in total, plus five weight plates each massing approximately 4.00 kilograms, the combined mass of the chosen weight plates 30 is 30.00 kilograms. If the load cell 70 is producing the correct load signal for this amount of chosen load, the signal from the load cell 70 will tell the computer processor that the load is 30.00 kg (force). However, if the signal from the load cell 70 has drifted, the signal from the load cell 70 will give a slightly different measured value for the load. Similarly, if the individual weight plates 30 are not exactly 4.00 kilograms each due to natural variation in weight, or due to friction in the system slightly altering the measured weight of the weight plates 30, the signal from the load cell 70 will give a slightly different measured value for the load. Based on the fact that weight stack strength equipment 100 uses known discrete weight increments, a small drift can automatically be compared to the expected weight, and the processor can note the difference between the measured weight (from the load cell 70) and the expected weight (based on the known discrete weight plates 30 used in the weight stack) to determine both the correct value of the weight of the selected weight plates 30 and the drift in the signal from the load cell 70 (the difference between the correct value and the measured value). It can use this difference to recalibrate the load measurement system or load cell 70 to compensate for this drift.

To use the auto-calibration method described here with the weight stack strength machine 100 in the previous example, it is important to first determine the rounding range for each weight plate 30 in the weight stack strength machine 100. This rounding range will be used by the computer to determine the actual amount of weight lifted based on the signal from the load cell 70, which may have some small amount of drift. For example, if the signal from the load cell 70 says that a user is lifting 45.85 kg (force), the computer or processor must first determine what is the most likely amount of weight actually being lifted, based upon the known discrete values of the weight plates 30 used in the weight stack strength machine 100. See Table A below (shown with examples of possible Load Cell Signal values, in kg):

TABLE A

| Number of Plates | Cumulative Weight Plate Mass kg | Rounding Range (example) kg | Load Cell Signal kg | Difference (Remainder) kg |
|---|---|---|---|---|
| (Top Plate) 0 | 10.00 | 9.5-10.5 | 10.00 | 0.00 |
| 1 | 14.00 | 13.5-14.5 | 13.89 | -0.11 |
| 2 | 18.00 | 17.5-18.5 | 18.18 | 0.18 |
| 3 | 22.00 | 21.5-22.5 | 22.05 | 0.05 |
| 4 | 26.00 | 25.5-26.5 | 25.92 | -0.08 |
| 5 | 30.00 | 29.5-30.5 | 29.86 | -0.14 |
| 6 | 34.00 | 33.5-34.5 | 33.82 | -0.18 |
| 7 | 38.00 | 37.5-38.5 | 37.83 | -0.17 |
| 8 | 42.00 | 41.5-42.5 | 41.81 | -0.19 |
| 9 | 46.00 | 45.5-46.5 | 45.80 | -0.20 |
| 10 | 50.00 | 49.5-50.5 | 49.79 | -0.21 |
| 11 | 54.00 | 53.5-54.5 | 53.82 | -0.18 |
| 12 | 58.00 | 57.5-58.5 | 57.78 | -0.22 |
| 13 | 62.00 | 61.5-62.5 | 61.79 | -0.21 |

Based on this example, it is noted that for most of the rows above, the values for the difference between the value of the signal from the load cell 70 and the actual mass (the remainders) of the selected weight plates 30 are around negative 0.20 kg (force). This means that the signal from the load cell 70 appears to be reading about 0.20 kg lower than the value that it should be reading. Based on this knowledge, it is possible to have the computer recalibrate the signal from the load cell 70 to better match the actual mass being lifted. Note that in the example above, the load cell 70 is recalibrated based on the median value of the remainder, but it is possible and even desirable to recalibrate the load cell 70 for each individual mass level rather than recalibrating the load cell 70 based on the median value of the remainder for all mass levels. For instance, if every time 2 weight plates 30 (nominally 18.00 kg since it includes two weight plates 30 plus the top weight plate) are lifted, the remainder is approximately positive 0.18 kg, then the appropriate recalibration for the load cell 70 at that mass level is to decrease the reading by 0.18 kg. If every time ten plates (nominally 50.00 kg) are lifted, the remainder is approximately negative 0.21 kg, then the appropriate recalibration for the load cell 70 at that mass level is to increase the reading by 0.21 kg. In this way, the signal from the load cell 70 can be calibrated at each mass level to accurately reflect the weight that the user has chosen to use for their exercise.

TABLE B

| Number of Plates | Weight Plate Mass kg | Expected Mass (Table) kg | Rounding Range (example) kg | Load Cell Signal kg | Difference (Remainder) kg |
|---|---|---|---|---|---|
| (Top Plate) 0 | 10.08 | 10.00 | 9.5-10.5 | 10.00 | 0.00 |
| 1 | 13.97 | 14.00 | 13.5-14.5 | 13.89 | -0.11 |
| 2 | 18.09 | 18.00 | 17.5-18.5 | 18.18 | 0.18 |
| 3 | 22.01 | 22.00 | 21.5-22.5 | 22.05 | 0.05 |
| 4 | 25.99 | 26.00 | 25.5-26.5 | 25.92 | -0.08 |
| 5 | 29.89 | 30.00 | 29.5-30.5 | 29.86 | -0.14 |
| 6 | 33.95 | 34.00 | 33.5-34.5 | 33.82 | -0.18 |
| 7 | 38.02 | 38.00 | 37.5-38.5 | 37.83 | -0.17 |
| 8 | 41.81 | 42.00 | 41.5-42.5 | 41.81 | -0.19 |
| 9 | 45.88 | 46.00 | 45.5-46.5 | 45.80 | -0.20 |
| 10 | 50.04 | 50.00 | 49.5-50.5 | 49.79 | -0.21 |
| 11 | 53.91 | 54.00 | 53.5-54.5 | 53.82 | -0.18 |
| 12 | 57.76 | 58.00 | 57.5-58.5 | 57.78 | -0.22 |
| 13 | 61.96 | 62.00 | 61.5-62.5 | 61.79 | -0.21 |
| 14 | 66.16 | 66.00 | 65.5-66.5 | 65.88 | -0.12 |
| 15 | 69.92 | 70.00 | 69.5-70.5 | 69.81 | -0.19 |

Table B shows how using the expected mass can be used to remove extraneous information due to small variations in the actual mass in the individual weight plates 30. Rather than calculating the remainder based on the actual mass of the various weight plates 30, which may vary from one weight stack strength machine 100 to the next, the remainder can be calculated based on the expected mass, which is based on the amount of weight that a user expects to be lifting when performing an exercise. This expected mass would typically be a round number that represents approximately the amount of mass being used for exercise. A user typically expects to be lifting an amount of mass (or weight) that can be described by round numbers. If a user wants to lift 34 kilograms (approximately 75 pounds), the user does not usually want to have the mass displayed accurate to two decimal points (in the example above, 33.95 kg). Instead, they want to know that they are lifting about 34 kilograms. By using a table of expected mass, the user is provided data related to their exercise performance without getting bogged down with confusing details such as weight measured out to two decimal places. In this example, the user still gets the performance data they desire. In addition, the load cell 70 can still be calibrated, but it is calibrated to the expected mass (or nearest round number mass) rather than an actual mass that would require each weight plate 30 to be individually weighed.

Incremental weights can also be used in this system, as long as the rounding ranges are set (i.e., programmed to the processor) appropriately. For an incremental weight to be used, the user would select the number of plates from the primary weight stack, then additionally select the incremental weight to be added to the primary weights. Rounding ranges are typically pre-set in the system to account for the size of incremental weights to be used on the system. See Table C below:

TABLE C

| Number of Plates | Incremental Weights kg | Expected Mass kg | Rounding Range kg |
| --- | --- | --- | --- |
| (Top Plate) 0 | | 10.00 | 9.5-10.49 |
| | +1 | 11.00 | 10.5-11.49 |
| | +2 | 12.00 | 11.5-12.49 |
| | +3 | 13.00 | 12.5-13.49 |
| 1 | | 14.00 | 13.5-14.49 |
| | +1 | 15.00 | 14.5-15.49 |
| | +2 | 16.00 | 15.5-16.49 |
| | +3 | 17.00 | 16.5-17.49 |
| 2 | | 18.00 | 17.5-18.49 |
| | +1 | 19.00 | 18.5-19.49 |
| | +2 | 20.00 | 19.5-20.49 |
| | +3 | 21.00 | 20.5-21.49 |
| 3 | | 22.00 | 21.5-22.49 |
| | ... | ... | ... |

Figure 4:
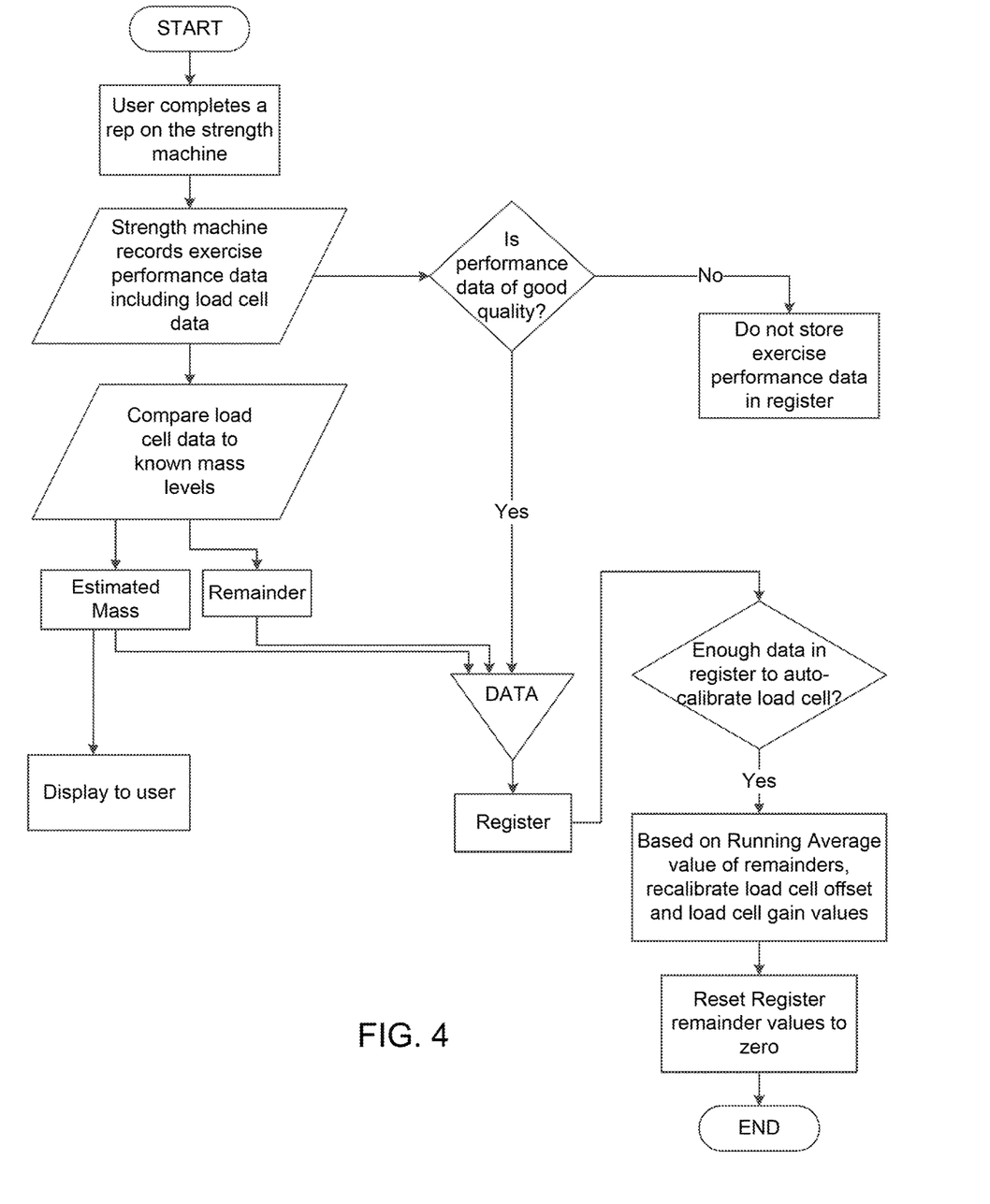
FIG. 4 is a flow chart showing an embodiment of the steps used to auto-calibrate a strength machine.

FIG. 4 shows a flow chart showing an embodiment of the steps used to auto-calibrate a strength machine. In this flow chart, it is seen that a user performs a rep (or one cycle of lifting a selected number of weight plates 30 and returns the weight plates 30 to the starting position). The weight stack strength machine 100 measures the weight of the selected weight plates 30 using the load cell 70 and records this information. To determine the mass of the weight plates 30 picked up, the weight stack strength machine 100 finds the measured weight in the rounding ranges (e.g., in Table C) and determines the corresponding expected mass. The weight stack strength machine 100 also calculates a remainder which is the difference between the measured weight and the estimated mass (i.e., the expected mass that must have been lifted as part of the exercise because you cannot lift partial weight plates 30). Thus, the remainder may be obtained from a subtraction operation and may have a sign that is either positive or negative, depending on whether the load cell data value is higher or lower than the expected mass estimated by the system. Based on the lookup table, the weight stack strength machine 100 can show the user on the display console 110 the amount of weight being lifted in the performance of the exercise. In other embodiments, the comparison of load cell data to expected mass levels can include dividing the load cell data (less a known mass corresponding to use of the machine 100 with no weight plates 30) by the expected weight plate mass in order to determine a quotient. The quotient, rounded to the nearest integer corresponds (e.g., in a lookup table) to the number of plates lifted, and then the system can arrive at the estimated mass according to expected mass increments of the weight plates 30. In such embodiments, the remainder of FIG. 4 is the difference between the quotient and the nearest integer, which difference may be positive or negative.

Figure 5:
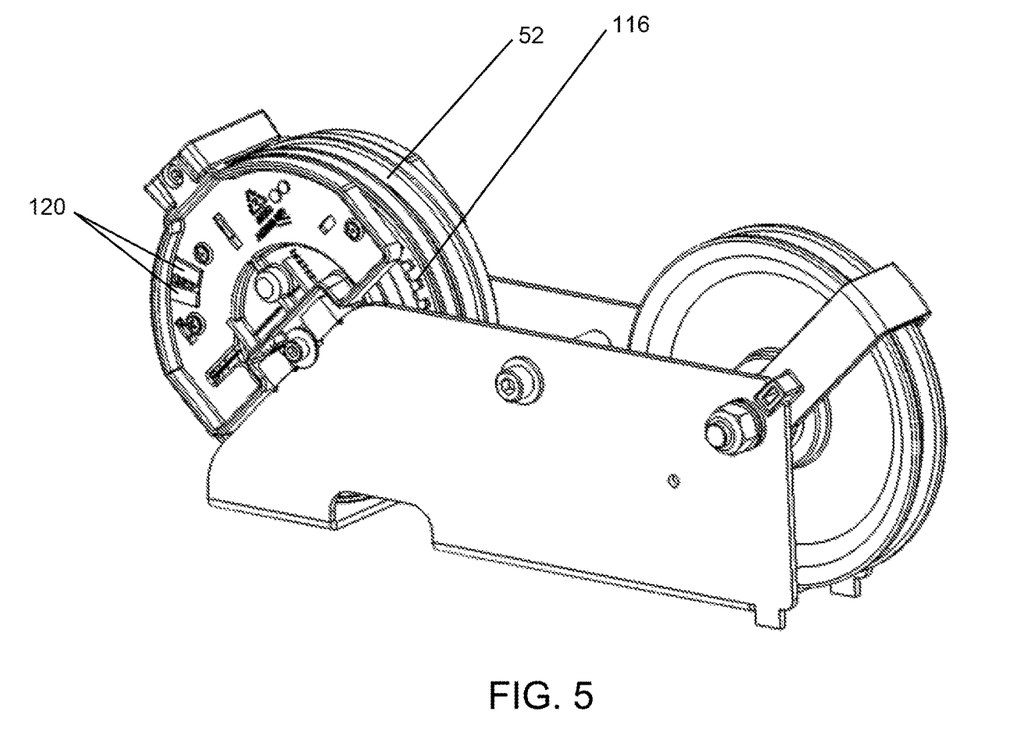
FIG. 5 is a close-up view of a load cell mechanism from the weight stack of FIG. 2.

If the quality of the data is good, and the data coming from the load cell 70 is good data that can be trusted, the weight stack strength machine 100 then can use the expected mass and the remainder to check on the signal drift from the load cell 70, and to use this data to auto-calibrate the load cell 70 if the signal from the load cell 70 appears to be drifting. The auto-calibration of the load cell 70 refers to resetting (i.e., in the processor of the load measurement system) one or more parameters in the force calculation algorithm, and doing so from normal exercise use of the weight stack strength machine 100 without an operator initiating a dedicated calibration routine. The data can be determined to be good quality data based on a variety of criteria. For instance, the data can be determined to be good quality if the rep is a complete rep, and/or if the signal from the load cell 70 was consistent throughout the entire rep. To determine if the rep was complete, travel distance of the chosen weight plates may be measured. For example, as shown in FIG. 5, an encoder comprising teeth 116 and sensors 120 can be used in conjunction with a pulley 52 to measure distance of travel and direction of travel based on the rotation of the pulley 52. In this example, the encoder is a quadrature encoder which is a type of incremental encoder used in many applications where sensing the direction of movement is required. The encoder can sense teeth 116 that rotate with the pulley 52, and sensors 120 are used to sense rotation and direction of rotation of the pulley 52. By monitoring position and direction, the pulley 52 can determine when the rep starts and finishes. If the weight plates 30 do not reach a minimum raised position and return to a maximum lowered position, the rep is not considered complete. To measure consistency of the rep, the load cell output and/or the speed of the rep can be measured, and a maximum deviation (e.g., 20%) from the average reading can be used to determine whether or not the rep was consistent enough to create good quality data. Regardless of the criteria used to determine if the data is of good quality, only data that is of good quality should be used to auto-calibrate the load cell 70. The good quality data is fed into a register or memory storage device. Once there is enough data to show that the signal from the load cell 70 has in fact drifted, the weight stack strength machine 100 can then perform the auto-calibration to recalibrate the load cell 70 by an amount approximately equal to the average remainder from the good quality data. At this point, the register would typically be cleared so that any new data stored in the register would not be tainted by old data gathered prior to the recalibration. Alternatively, the register might instead record when a recalibration occurred so as to be able to segregate data recorded prior to the calibration and data recorded subsequent to the calibration.

Figure 6:
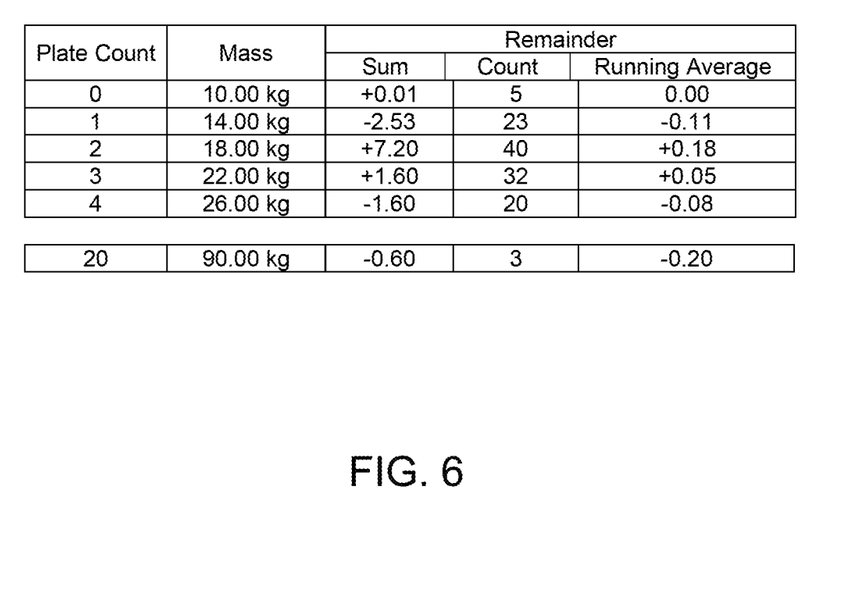
FIG. 6 is a schematic of the register for storing exercise performance data and average remainder values.

FIG. 6 shows a schematic of the register and how it works. As the data comes into the register, the expected mass of a given performance rep of the exercise is used to determine the row where the remainder data will be used, each row corresponding to a different weight plate count. For any particular row, the remainder will be added to a remainder sum for that mass value, and a count will be incremented by one showing another data point has been added to the register. This allows the weight stack strength machine 100 to calculate a running average of the remainder for each mass value, as appropriate array(s) are stored in the register. Once enough data points are gathered, the running average of the remainder can be used to estimate how much the signal from the load cell 70 has drifted over time, and this information can be used to recalibrate the load cell 70 as described previously. In addition, by using load cell 70 data from multiple expected weight levels, it is also possible to check the gain level of the signal from the load cell 70, allowing the weight stack strength machine 100 to auto-calibrate the load cell 70 for both gain as well as offset. Whether solving for gain or offset, these calibration values for the force calculation of the load measurement system can be achieved by performing a linear regression calculation on the remainders stored as elements of the array.

An additional benefit of the present invention is that when the load cell 70 is properly calibrated, it can also be used to measure the tension in the cable 50 when no weight plates 30 are being lifted When in the "at rest" or static position, the cable 50 should be in slight tension to ensure the load is engaged throughout the whole lifting motion. Therefore, it is important to monitor the static tension over time, as cable-stretch and other factors can cause the tension to change with time. The load cell 70 can measure the static tension in the cable 50, which can be used to diagnose when the cable 50 is properly tensioned. If it is determined that the cable 50 is not properly tensioned (if it is either too loose or too tight), this information can be passed on to the maintenance team at a fitness facility so that they can rectify the improperly tensioned cable 50. Because the tension in the cable 50 is small, the set tension must be precise. Consequently, the natural drift of the load cell 70 over time can cause the tension reading to be grossly inaccurate. Thus, the automatic recalibration done when lifting the weights, as described in the previous paragraphs, is helpful to ensure that the zero-load readings are accurate, ultimately providing immediate and accurate notification if maintenance to the static tension in the cable is needed.

Other possible uses of the described system can be envisioned as well. By measuring the loads during the lifting phase and again on the return (lowering) phase, which is determined by the rotational direction of the pulley 52 that is measured by the incremental encoder, it is possible to calculate binding or high friction between the weight plates 30 and the guide rods 60. In one example, the processor of the load measurement system may calculate a difference between the measured lifting mass and the measured lowering mass to arrive at a hysteresis value, and the processor may determine if the hysteresis value exceeds a threshold value. The incremental encoder in the pulley 52 can also measure speed and acceleration. As a result, it is possible to measure the aggressiveness of the user in lifting the weight plates 30 (based on acceleration and impulse loads applied to the weight plates 30 while lifting, which are found using the measurements from the incremental encoder in the pulley 52). For this information to be useful, it is important that the load measurement system or load cell 70 be calibrated correctly and accurately.

To improve accuracy of the offset correction, it may be beneficial to use a weighted average of the acquired data. A two-point calibration consists of determining the offset and gain (slope of a line). It is typically easiest to determine the offset value of a system when the load measurement system or load cell 70 is in a no-load condition. Conversely, it is typically more accurate to determine the gain of a system when the load measurement system is at or near full scale (maximum loading). This is because other values can then be interpolated rather than extrapolated, as interpolation tends to reduce measurement errors, while extrapolation often tends to increase measurement errors.

In order to determine the gain, a single amount of weight in the form of weight plates 30 is lifted and this is used along with the offset to complete the calibration. All things being equal, one would prefer to calibrate a load measurement system by determining the gain at or near full scale. However, this being a human-powered device, we must choose a nominal value for an exercise that any technician (or any user of the strength machine) would reasonably be able to do. For example, we may choose to calibrate the system at 50% scale, using load measurements taken when only half of the weight stack is lifted during the exercise.

To improve the accuracy of the results, a weighted average can be employed to allow higher-quality data to overwhelm the lower-quality data. More emphasis (higher weighting value) will be applied to the results obtained more near the calibration point. For weight results that are further away from this calibration point (either lower or higher weights), relatively less emphasis will be assigned. Specifically, when calculating gain, more weighting value will be given to load measurement results taken at higher load levels, and very little weighting value will be given to load measurement results at very low load levels.

Accuracy can also be improved by taking into account forces associated with acceleration of the mass. That is, when measuring the force during the exercise session, as described above, any amount of acceleration of the lifted mass will result in extraneous forces in an amount equal to the mass times the acceleration. For example, if the mass is being accelerated upward during the calibration measurement, the measured force will be slightly larger than the static (non-accelerating) force. Similarly, if the mass is being decelerated upward during the calibration measurement, the measured force will be slightly smaller than the static (non-accelerating) force. In order to compensate for these extraneous forces, using the incremental encoder on the pulley 52, the acceleration of the mass can be measured at the point in time that the calibration measurement is being taken, and this acceleration can be translated to a force that can be used to "correct" the calibration measurement.

Various features and advantages of the invention are set forth in the following claims.

The invention claimed is:

1. A method of operating a load measurement system of a strength machine having plates, one or more of which are moved during an exercise by one or more users on the strength machine, the plates having expected mass values that are representative of the mass values of the plates, the method comprising:
    measuring, with a load cell of the load measurement system, a load of the plates being moved during the exercise;
    comparing, with a processor of the load measurement system, the measured load to the expected mass values; and
    determining, with the processor, an estimated mass of the plates being moved, the estimated mass corresponding to one of the expected mass values.

2. A method as claimed in claim 1, further comprising calculating, with the processor, a difference between the estimated mass and the measured load to arrive at an offset.

3. A method as claimed in claim 2, further comprising applying the offset to future measuring steps within the processor.

4. A method as claimed in claim 1, wherein the processor further:
    determines an acceleration of the mass of plates;
    calculates an acceleration force associated with the acceleration; and
    adjusts the measured load to account for the acceleration force.

5. A method as claimed in claim 1, further comprising:
    measuring, with the load cell, the load of the plates while the plates are being lifted to result in a measured lifting mass;
    measuring, with the load cell, the load of the plates while the plates are being lowered to result in a measured lowering mass;
    calculating, with the processor, a difference between the measured lifting mass and the measured lowering mass to arrive at a hysteresis value; and
    determining, with the processor, if the hysteresis value exceeds a threshold value.

6. A method as claimed in claim 1, further comprising:
    determining, with the processor, the estimated mass as the expected mass value nearest the measured load;
    calculating, with the processor, a remainder between the measured load and the nearest expected mass value;

storing, with the processor, the remainder as an element in an array corresponding to the nearest expected mass value;

repeating the measuring, determining, calculating, and storing steps with a plurality of expected mass values to fill a plurality of elements in the array;

calculating, with the processor, an offset value for a force calculation of the load measurement system by performing a linear regression calculation on the remainders stored as elements of the array;

calculating, with the processor, a gain value for the force calculation of the load measurement system by performing a linear regression calculation on the remainders stored as elements of the array; and automatically resetting the processor to apply the calculated offset value and the calculated gain value to future measuring steps, so that the strength machine auto-calibrates based on the load measurements taken by the load cell during the exercise.

7. A method as claimed in claim 1, further comprising:

calculating, with the processor, a difference between the estimated mass and the measured load to arrive at an offset;

measuring the load of the plates with the load cell at a resting state; and calculating, with the processor, a cable tension at a resting state based upon the measured load at the resting state and the offset.

8. A method as claimed in claim 1, further comprising:

calculating, with the processor, a difference between the estimated mass and the measured load to arrive at an offset;

measuring the load of the plates with the load cell at a resting state;

calculating, with the processor, a cable tension at the resting state based upon the measured load at the resting state and the offset; and determining, with the processor, if the cable tension at the resting state exceeds a threshold value.

9. A method as claimed in claim 1, further comprising:

calculating, with the processor, a difference between the estimated mass and the measured load to arrive at an offset;

measuring the load of the plates with the load cell at a resting state;

calculating, with the processor, a cable tension at the resting state based upon the measured load at the resting state and the offset; and determining, with the processor, if the cable tension at a resting state falls below a threshold value.

10. A method of calibrating a load measurement system of a strength machine having a plurality of plates, one or more of which are moved during an exercise by one or more users on the strength machine, each of the plurality of plates having expected mass values that are representative of the mass values of the plates, the method comprising:

measuring, with a load cell of the load measurement system, a first load of a first number of plates being moved during the exercise;

comparing, with a processor of the load measurement system, the first measured load to the expected mass values in order to arrive at a first estimated mass corresponding to one of the expected mass values;

calculating, with the processor, a first remainder as a difference between the first estimated mass and the first measured load;

measuring, with the load cell, a second load of a second number of plates being moved during the exercise;

comparing, with the processor, the second measured load to the expected mass values in order to arrive at a second estimated mass corresponding to another one of the expected mass values;

calculating, with the processor, a second remainder as a difference between the second estimated mass and the second measured load;

calculating, with the processor, an offset for a force calculation of the load measurement system based on the first remainder and the second remainder; and automatically resetting the processor to apply the calculated offset to future measuring steps so that the strength machine auto-calibrates based on the first and second load measurements taken by the load cell during the exercise.

11. A method of calibrating a load measurement system of a strength machine having a plurality of plates, one or more of which are moved during an exercise by one or more users, each of the plurality of plates having expected mass values that are representative of the mass values of the plates, the method comprising:

measuring, with a load cell of the load measurement system, a first load of a first number of plates being moved during the exercise;

comparing, with a processor of the load measurement system, the first measured load to the expected mass values in order to arrive at a first estimated mass corresponding to one of the expected mass values;

calculating, with the processor, a first remainder as a difference between the first estimated mass and the first measured load;

measuring, with the load cell, a second load of a second number of plates being moved during the exercise;

comparing, with the processor, the second measured load to the expected mass values in order to arrive at a second estimated mass corresponding to another one of the expected mass values;

calculating, with the processor, a second remainder as a difference between the second estimated mass and the second measured load;

calculating, with the processor, a gain for a force calculation of the load measurement system based on the first remainder and the second remainder; and automatically resetting the processor to apply the calculated gain to future measuring steps so that the strength machine auto-calibrates based on the first and second load measurements taken by the load cell during the exercise.

* * * * *